April 21, 1964 E. STORM ETAL 3,130,306
NUCLEAR RADIATION DOSIMETER USING COMPOSITE FILTER
AND A SINGLE ELEMENT FILTER
Filed Sept. 19, 1961 4 Sheets-Sheet 1

INVENTOR.
Ellery Storm, Simon Shlaer
BY

INVENTOR.
Ellery Storm, Simon Shlaer

INVENTOR.
Ellery Storm, Simon Shlaer

United States Patent Office 3,130,306
Patented Apr. 21, 1964

3,130,306
NUCLEAR RADIATION DOSIMETER USING COMPOSITE FILTER AND A SINGLE ELEMENT FILTER
Ellery Storm and Simon Shlaer, Los Alamos, N. Mex., assignors to the United States of America as represented by the United States Atomic Energy Commission
Filed Sept. 19, 1961, Ser. No. 139,315
5 Claims. (Cl. 250—83)

This invention relates to nuclear radiation dosimeters and, more particularly, to personnel film badges for the detection and quantization of X-ray, gamma-ray, beta-ray and neutron exposures.

Individuals whose work is likely to involve exposure to nuclear radiations must be provided with a device which is in constant readiness to indicte exposures of the X-ray variety. It is necessary that this device make a permanent recording which can be later analyzed so that an estimate of the amount of radiation received by the individual can be determined.

The nuclear radiation dosimeter of the personnel monitoring film badge type has found particular favor because of the convenience in its use and its reliability in showing that an exposure has occurred. However, the film badge of the prior art suffers the defect of non-accessibility of accurate quantization of its information because the sensitivity of the film is not uniform with respect to gamma rays of different energies. For example, the film is as much as 25 times more sensitive to 40 kev. X-rays than it is to 1250 kev. X-rays. It follows that in the event of an inadvertent exposure, where the X-ray energy of the exposure is unknown, the film badge of the prior art is deficient in providing accurate data as to the dosage received.

Attempts have been made in the prior art to correct for the energy dependence of the film. One method is to calibrate the film directly to the sources being used by the personnel to be protected. This expedient is satisfactory only where the sources are few in number and of the same relative energy. In many situations there are too many different kinds of sources of exposure conditions to permit the use of this method on a routine basis.

A second method for correcting for the energy dependence of the film is to determine the energy of the X-rays to which the badge has been exposed by means of two or more filters over different areas of the film. The filters differ in atomic number or thickness resulting in different densities or opacities of the areas of the film which were under the different filters when the film is exposed to low energy X-rays. In the linear portion of the density versus exposure curve, the ratio of the densities under the different filters is assumed to be unique with energy and is used to determine the X-ray energy of the exposure. This method has been employed to a considerable extent but experience has shown that it is subject to error. One source of error is that the density ratio is not unique with energy as has been asumed. For example, the density ratio obtained with a monochromatic source at 40 kev. may differ by more than a factor of 2 from the density ratio obtained with a continuous spectrum source having an effective energy of 40 kev. Further, the degree to which the density ratios obtained with monochromatic and continuous spectrum sources differ depends upon the peak energy and filtration of the continuous spectrum source. Another source of error occurs when the films are exposed to gamma rays of two or more energies, because the density ratios are affected by the proportion of each energy received by the film.

It is apparent that a film badge capable of uniform response to energies extending over the spectrum to be encountered would be exceedingly useful.

It is, accordingly, a prime objective of the present invention to provide a radiation responsive film badge in which means are provided for reducing the energy dependence of the film dosimeter.

Another object is to provide a single filter in connection with monitoring films, in which a plurality of elements (chemical) are so combined that the energy dependence of the resulting monitoring badge is reduced to acceptable limits. These limits in the present case are selected to lie within 0.7 and 1.3 of the value of the sensitivity at 1000 kev.

Still another object is to provide a radiation dosimeter film badge which will give quantitative information of gamma-ray, beta-ray and neutron exposure.

The manner in which the above and other objectives are accomplished by the present invention will become apparent as the description proceeds with reference to the drawing in which FIGURE 1 is a graph illustrating the basic principles of the present invention.

Figure 1:
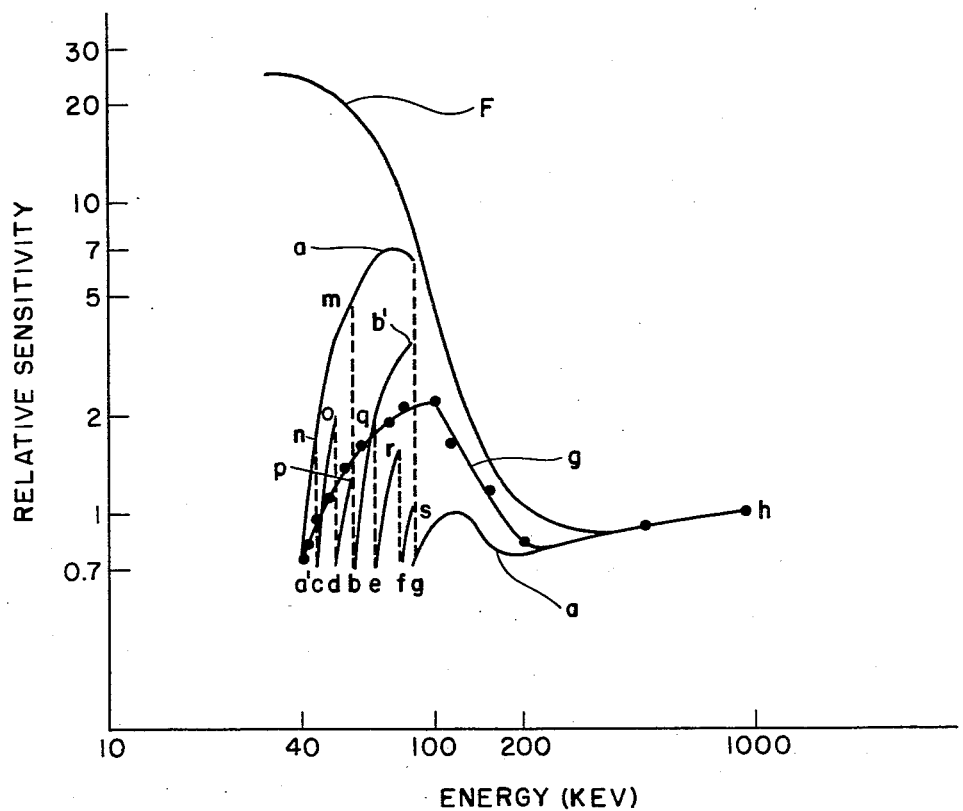

Referring to FIGURE 1, the ordinate is relative sensitivity on a logarithmic scale, and the abscissa is in radiation energy units on a logarithmic scale. The relative sensitivity is defined as the reciprocal of the roentgen exposure required to obtaain a selected film density or opaqueness. The reciprocal roentgen exposure is selected to be equal to unity at 1000 kev. Curve F is the measured uncorrected response of the film to X-rays of energies extending from 40 kev. to 1250 kev. It is seen that the response in roentgens of the photographic film is nearly constant above 200 kev. but it rises rapidly below 200 kev. and reaches a peak at about 40 kev. The response of the film to 40 kev. X-rays is about 20 to 30 times greater than the response to 1000 kev. X-rays. Since the energy of X-rays of an inadvertent exposure is generally unknown it is apparent that the energy dependence of the film is the largest source of error in trying to determine the amount of a past exposure with film badges.

The present invention reduces the energy dependence of the film by providing a novel compensating filter to be used with the film. In this connection, it is pointed out that dental film is conveniently utilized and that although there are minor differences between films of different origin, in general the characteristics of dental films are essentially similar so that the solution provided by the present invention is applicable to all films commonly utilized for the purpose.

The principles underlying the design of the compensating filter utilize the absorption coefficients of certain elements (chemical) selected. The absorption data are available in the art and specifically are available in the National Bureau of Standards Circulars 583 as corrected by the Supplement to NBS Circular 583 by R. T. McGinnies, published in 1959. The elements utilized are selected by the position of their K-edges and reference is made to the publication, Nucleonics, for March 1955, for the K-edge information.

The basic principle of the present invention is to select filter elements by the positions of their K-edges and then to calculate the required thickness of each element by the amount of absorption needed. For example, if an element having a K-edge at 90 kev. and a thickness which results in a filter giving a relative sensitivity to the film of 0.7 at the low K-edge value is selected, the calculated film response will be as shown in curve $a$ of FIGURE 1. Above 90 kev. the sensitivity lies within 0.7 to 1.0. Below 90 kev. the curve peaks at about 65 kev. at a relative sensitivity of about 7.0 (curve $a$). If now, a second element is chosen having a K-edge at 65 kev. at $b$ and the thicknesses of the two elements are adjusted to obtain a calculated (relative sensitivity of 0.7 at both K-edges, the double-peaked curve $a'mbb'gh$ of calculated film relative sensitivity is obtained. The relative sensitivity above 90 kev. is essentially unchanged. Below 90 kev. the peaks show a relative sensitivity of about 5. The trend is now evident. As more and more elements, for example 6, with K-edges between 40 and 90 kev. are added to the filter and their thicknesses selected so that the sensitivity at the lower K-edge value retains the value of 0.7, the relative sensitivity above 90 kev. remains unchanged, but the calculated relative sensitivity steadily decreases between 40 and 90 kev. as shown by the saw-tooth curve $a'ncodpbqerfsgh$. The film response with this 6-element filter appears to lie between 0.7 to 2.0.

The amount of material required in the filter is calculated as follows: First assume the unfiltered film response is to be reduced using only one element. There are two values of the absorption coefficient at the K-edge energy of the element selected and, accordingly, there are two response values, the larger one corresponding to the lower value of the true absorption coefficient and the smaller one corresponding to the higher value of the true absorption coefficient. The smaller response value at the K-edge is not to go below a selected defined value, $F_k$, and the thickness, $x$, which reduces the response to that limit will be used in the filter. If $F_0$ is the unfiltered film response at the K-edge energy, then $F_k$ is given by $$F_k = F_0 e^{-u_H x}$$

or $$u_H x = \ln F_0 - \ln F_k$$

where $u_H$ is the higher K-edge value of the true absorption coefficient. The response of the film, $F_f$, filtered by the element of thickness $x$, is calculated as a function of energy using the equation $$F_f(E) = F_0(E) e^{-u(E)x}$$

where $F_0(E)$ is the unfiltered film response at energy $E$, and $u(E)$ is the true absorption coefficient of the filter element at each such energy $E$.

Now assume that the response is to be reduced using two elements. Each element has a K-edge and the smaller response value at each edge is not to go below the defined limit $F_k$ (in this example $F_k = 0.7$). Let $F_{0_1}$ and $F_{0_2}$ be the unfiltered film responses at the K-edge energy $E$ of elements 1 and 2 respectively. Then the thickness $x_1$ of element 1 and the thickness $x_2$ of element 2 which gives $F_k$ are obtained by solving the following set of equations:

$$u_{H_1} x_1 + u_2 x_2 = \ln F_{0_1} - \ln F_k$$

$$u_1 x_1 + u_{H_2} x_2 = \ln F_{0_2} - \ln F_k$$

where $u_{H_1}$ is the higher K-edge value of the true absorption coefficient of element 1 at the K-edge energy of element 1, $u_2$ is the true absorption coefficient of element 2 at the K-edge energy of element 1, $u_1$ is the true absorption coefficient of element 1 at the K-edge energy of element 2, and $u_{H_2}$ is the higher K-edge value of the true absorption coefficient of element 2 at the K-edge energy of element 2. The response $F_f$ of the film, filtered by thickness $x_1$ of element 1 and thickness $x_2$ of element 2, is calculated as a function of energy using the equation $$F_f(E) = F_0(E) e^{-[u_1(E)x_1 + u_2(E)x_2]}$$

where $F_0(E)$ is the unfiltered film response at energy $E$, $u_1$ is the true absorption coefficient of element 1 at energy $E$, and $u_2$ is the true absorption coefficient of element 2 at energy $E$.

Similarly, for a filter containing $n$ elements, the element thicknesses which reduce the smaller film response values at the K-edges to $F_k$ are obtained by the simultaneous solution of the following $n$ equations:

$$u_{H_1} x_1 + u_2 x_2 + u_3 x_3 + \ldots + u_n x_n = \ln F_{0_1} - \ln F_k$$

$$u_1 x_1 + u_{H_2} x_2 + u_3 x_3 + \ldots + u_n x_n = \ln F_{0_2} - \ln F_k$$

$$u_1 x_1 + u_2 x_2 + u_{H_3} x_3 + \ldots + u_n x_n = \ln F_{0_3} - \ln F_k$$

. . . . . . . . . . . . . . . . . . . . . . . . . .

$$u_1 x_1 + u_2 x_2 + u_3 x_3 + \ldots + u_{H_n} x_n = \ln F_{0_n} - \ln F_k$$

The response of the film, $F_f$, filtered by the $n$ elements, is calculated as a function of energy using the equation $$F_f(E) = F_0(E) e^{-[u_1(E)x_1 + u_2(E)x_2 + u_3(E)x_3 + \ldots + u_n(E)x_n]}$$

However, tests on a filter so constructed, resulted in the measured values shown in curve $g$ of FIGURE 1. This curve shows an over-sensitivity of 2.3 at 100 kev. and the points do not fall on the calculated curve.

The reason for the discrepancy resulted from the assumption, in making the calculations, that the monochromatic radiation (utilized in making the measurements) would be merely attenuated and not changed in spectrum in passing through the filter. In reality the spectrum is changed or degraded by Compton scatter and especially by fluorescent radiation produced in the filter. The film response is smeared out by Compton scatter and fluorescent radiation. The over-sensitivity occurs at 100 kev. where the energy is high enough to excite the fluorescent X-rays of all the elements in the filter.

The fluorescent radiation reaching the film can be greatly reduced by placing a low atomic number element filter, such as copper, between the film and the multi-element filter.

Figure 2:
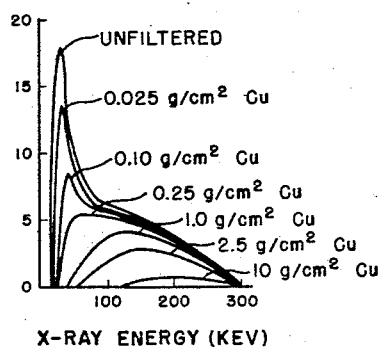
FIGURE 2 is a grap of the filtering effect of copper.

The absorptive effect of copper sheets of various thicknesses was empirically determined and charted against gamma or X-ray energies as shown in FIGURE 2.

A 0.020" thick sheet of copper was selected and applied between the film and the foregoing filter. This reduced the sensitivity at 100 kev. to unity, but cut off the film response below 70 kev.

Accordingly, a new filter was calculated with consideration for both the film energy dependence and the copper filter. Referring to FIGURE 3, curve F again shows the measured relative sensitivity of the film alone and curve F' is the calculated relative film sensitivity with a 0.020" copper filter interposed between the film and the radiation source.

The copper filter reduced the film response in the low energy region to a relative sensitivity of about 10. The curve peaks at about 65 kev. and falls off below this energy. Starting with this relative sensitivity, as shown by curve F', and using the above-described procedures and equations, the absorption of five elements having K-edges substantially evenly spaced between 40 and 90 kev. was calculated. The elements in the filter are chosen primarily on the basis of the location of their K-edges, although other factors serve to restrict the selection. For example, all elements above an atomic number of 83 are naturally radioactive and would fog the film; thus, the K-edge of bismuth, located at 90 kev. was the highest that could desirably be used. The calculations indicated that the film response improves when the K-edges of the elements are separated by substantially equal energy intervals. To some extent, availability and the chemical stability of the elements limit the selection. The elements chosen and the amounts of each are shown in the below table:

*Five-Element Film Filter*

| Elements | Atomic number | Amount of element (g./cm.²) | Form of element | K-edge energy (kev.) |
|---|---|---|---|---|
| Gadolinium | 64 | 0.148 | Gd₂O₃ | 50.229 |
| Erbium | 68 | 0.148 | Er₂O₃ | 57.483 |
| Tantalum | 73 | 0.114 | Ta powder | 67.400 |
| Gold | 79 | 0.117 | Au powder | 80.713 |
| Bismuth | 83 | 0.074 | Bi powder | 90.521 |

Figure 3:
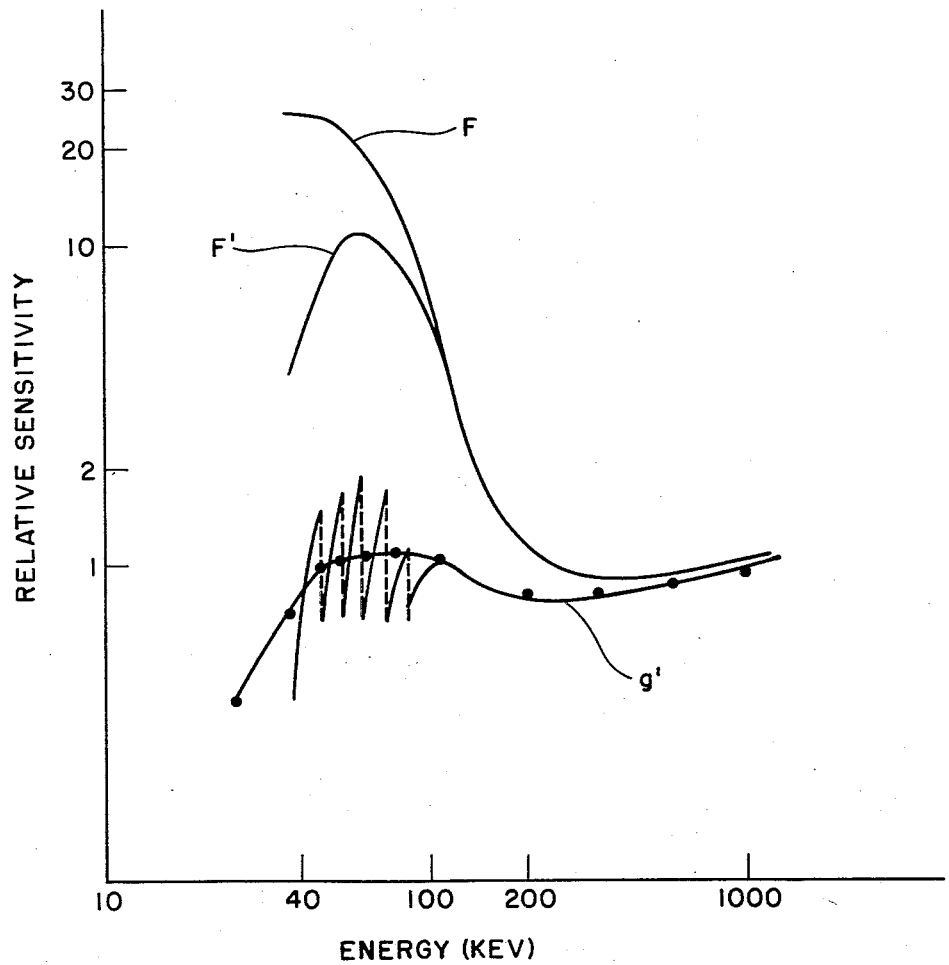
FIGURE 3 is a graph showing the effect of all the filter elements utilized in a film badge dosimeter of the present invention.

The 0.020″ copper sheet, plus the 5-element filter, gives a calculated response lying between 0.7 to 1.8 on the relative sensitivity scale from about 50 to 1250 kev., as shown by the saw-tooth curve of FIGURE 3.

The filter in the preferred embodiment is 1 centimeter square. The absorbing elements are comminuted and mixed and compacted with 3% paraffin binder. An alternative scheme would be to utilize a stack of elements each in sheet form. The thickness of each sheet would be a unique value and, consequently, would have to be fabricated for the purpose.

This 5-element filter, plus 0.020″ copper sheet, was incorporated into a badge and the measured response to a collimated beam of radiation was obtained as shown by curve g' of FIGURE 3.

It is essential in the interest of accuracy that no radiation reach the film other than that which passes through the copper and 5-element filter. To this end, the combination must be enclosed in an X-ray protecting shield.

Figure 4:
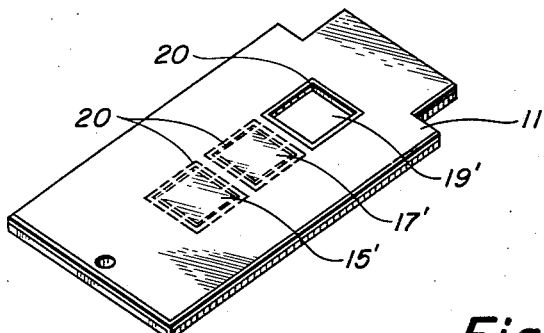
FIGURE 4 is a drawing of a preferred embodiment.
Figure 5:
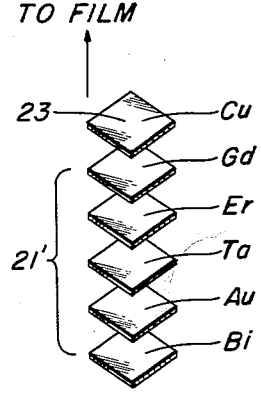
FIGURE 5 is an exploded perspective view of the preferred embodiment.

A film badge constructed in accordance with the present invention is shown in FIGURES 4 and 5.

FIGURE 4 shows the exterior of the plastic badge (styrene) having main body portion 9, and a lid 11 hinged by rivet 13 to the main body portion. An apparel-grasping clasp (not shown) can be fastened to the badge by any suitable means, such as a small bolt in eyelet rivet 13.

The complete badge is shown in exploded perspective in FIGURE 5. Film 25 of the dental X-ray type is secured firmly in large recess 12 in main body portion 9. The recess is only slightly larger than the outer dimensions of the film in order to confine the same, without lateral shifting, firmly against the adjacent wall and filters in the main body portion 9 and lid 11.

The main body portion is provided with shallow recesses 15 and 17 and an open window or aperture 19. The lid has a like set of recesses 15', 17' and window 19' in coinciding corresponding positions. The apertures 19 directly expose the film to the environment for response to beta rays and soft gamma rays.

In order that the portions of the film selected to be significant with respect to gamma rays and thermal neutrons in the event of exposure, will be exposed only to radiation passing through the filters, or window, and not to radiation due to scattering in the plastic, lead frames are provided to closely surround the filters and permit substantially only incident energy passing directly through the filters to affect the film. These lead frames are indicated by reference number 20. Each frame is an open bottom and top square box of lead. The internal dimension is one centimeter square to accommodate the one centimeter square filter components. The walls are 0.05 centimeter thick and the depth of the box is 0.165 centimeter. It follows that the small recesses in the badge main body portion and lid have a depth which is likewise 0.165 centimeter or slightly less to insure contact between the lead frames and the film protective covering.

The filter components constituting a complete filter are supported in each of the plastic body recesses. The film portion between recesses 15 and 15' is selected to be responsive to gamma rays and neutrons if encountered. To this end the composite filter 21 containing bismuth, gold, tantalum, erbium, and gadolinium is confined in the lead frame 20 in the recess adjacent the floor of the recess. The copper filter 23 is positioned in the lead frame against the composite filter on the film side.

It is desirable that the badge give a measure of thermal neutron exposure in the event of such an occurrence. This objective can be accomplished by covering separate areas of the film with filters which respond differently to thermal neutrons. Measurement and comparison of the opaqueness of the two areas gives data which can be quantized.

Two approaches are available for structures which will give quantized thermal neutron data. One approach is to provide a neutron shielding cup over the aforedescribed filter with the open end of the cup facing the film in recesses 17, 17'. More specifically, filters identical with the filters in recesses 15, 15' are placed in recesses 17, 17' but surrounded with a Li⁶F cup. The effect of the cup is to substantially completely shield the gadolinium in the filter from the neutrons. Gadolinium has a thermal cross section of about $5 \times 10^4$ barnes. Upon capturing a neutron, gadolinium emits gamma rays with energies of several mev. which produces film blackening. Thus, a significant thermal neutron response will occur in the film adjacent the gadolinium containing filter in recesses 17, 17' except for the effect of the Li⁶F shield. The reason for this is that the Li⁶ thermal neutron cross section is about $10^3$ barnes and the absorption of thermal neutrons in lithium does not give rise to the emission of gamma rays. Thus, the Li⁶F cups significantly reduce the thermal neutron film response. The difference in blackening between the Li⁶F covered gadolinium containing filter and the uncovered gadolinium containing filter is large enough to be used as a measure of thermal neutron exposure. In addition, the Li⁶F cups do not significantly affect the response to gamma rays.

However, there is a significant disadvantage to the use of Li⁶F cups in that the material is weak and readily subject to breakage. Accordingly, the second approach has been selected as the preferred one. The solution is to omit the gadolinium from one of the pairs of filters and to add a molybdenum sheet. The cross section of molybdenum is only about 3 barnes to thermal neutrons. The neutron film response under the non-galolinium containing filter is considerably lower than that obtained under the gadolinium containing filter. The difference in blackening between the film portions is used to quantize thermal neutron exposure in the event of its occurrence.

The non-galolinium containing filter 26 is shown in exploded position above recess 17. Filter 26 contains bismuth, gold, tantalum and erbium in the same amounts as are present in filter 21. A molybdenum sheet 24 having a thickness of 0.010″ is layed on the filter 26 on the film side and a copper sheet 23' of 0.020 thickness is added between the molybdenum sheet and the film. A similar set of filters repose on the other side of film 25 in the cover recess 17'.

All the components of each filter are secured in the respective recess by any suitable means such as adhesive, cement or adhesive tape.

Figure 6:
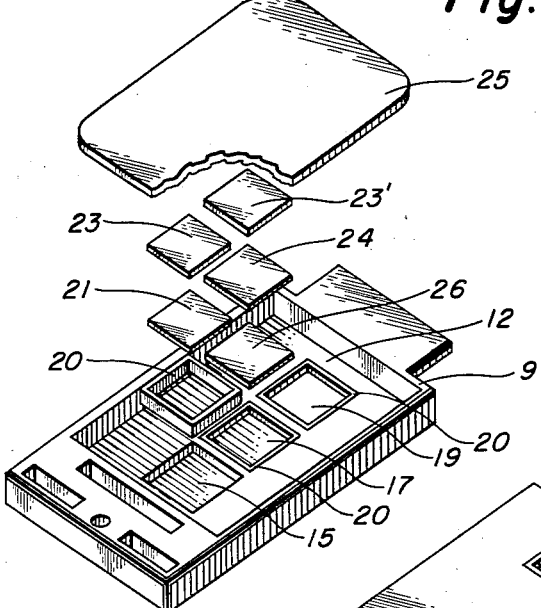
FIGURE 6 is a showing of an alternative filter embodiment.
Figure 7:
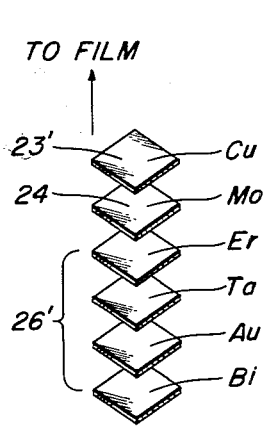
FIGURE 7 is a showing of still another filter embodiment.

The gadolinium containing filter 21 and the non-gadolinium containing filter 26 in a modified form are shown as 21' and 26', respectively in FIGURES 6 and 7, respectively. In this embodiment the elements are in sheet form and as shown, the gadolinium containing filter comprises sheets of bismuth, gold, tantalum, erbium and copper. The non-gadolinium filter shown in FIGURE 7 comprises bismuth, gold, tantalum, erbium, molybdenum and copper.

It is preferable, in order to reduce the amount of fluorescent radiation produced in the filter from reaching the film to arrange the elements in the order of progressive atomic numbers with the largest atomic number element furthest from the film.

The non-gadolinium filter can also be of comminuted elements formed into a compact as shown at 26 in FIGURE 5. The amounts of each of the elements, bismuth, gold, tantalum and erbium are respectively 0.074 g./cm.$^2$, 0.117 g./cm.$^2$, 0.114 g./cm.$^2$ and 0.148 g./cm.$^2$.

Figure 8:
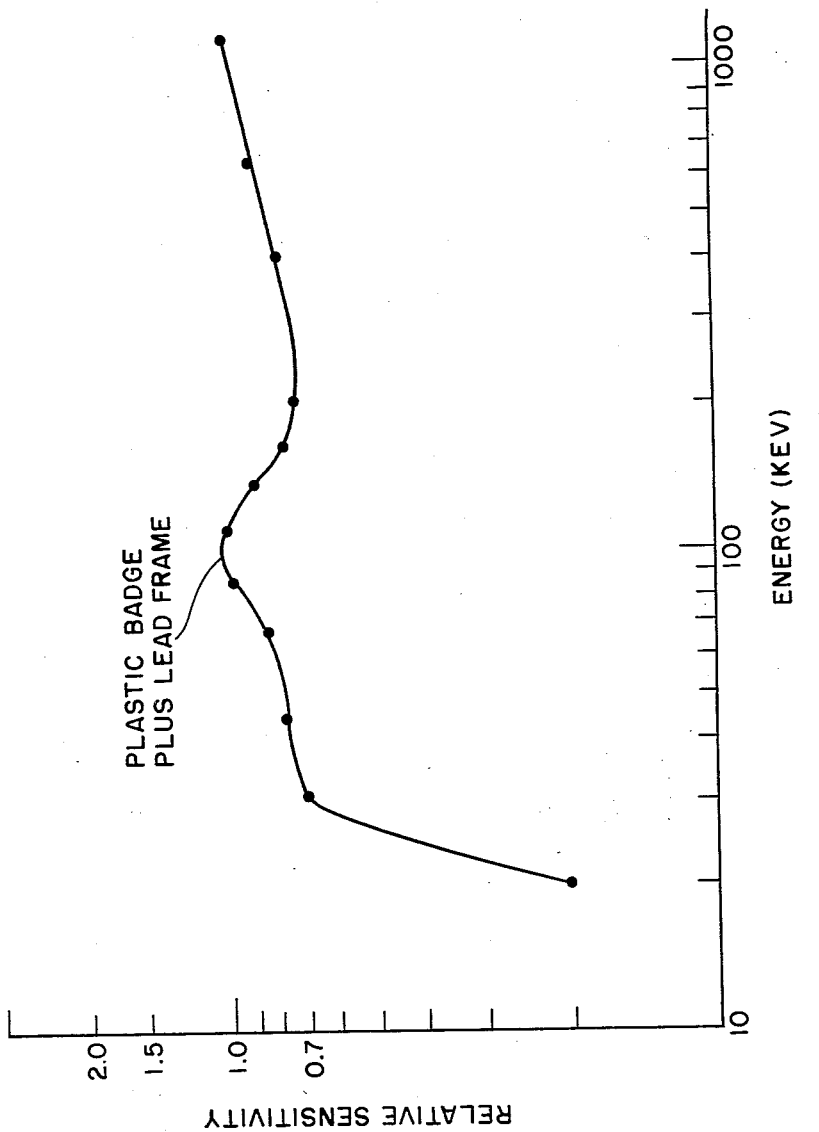
FIGURE 8 is a graph of the characteristics of the embodiment of FIGURES 4 and 5.

The response of the film (Du Pont 502) under recesses 15, 15', i.e., filtered by the copper, plus 5-element gadolinium containing filter, in the lead frame plastic badge is shown in FIGURE 8. The response is seen to be flat within ±30% from about 40 to 1250 kev.

The film badge constructed in accordance with the foregoing teachings was tested with various commercially available films. The film response fell within the following relative sensitivity limits from 40 to 1250 kev.: Du Pont 508, 0.55 to 1.0; Du Pont 555, 0.7 to 1.1; Eastman type II, 0.8 to 1.3 and Ilford PM-1, 0.6 to 1.0. Thus the response of each film fell essentially within the limits of ±30% if the film is calibrated at an energy where the sensitivity is midway between the extreme sensitivity limits. The same result can be achieved by applying a correction factor to 1250 kev. Co$^{60}$ calibration as follows: 0.77, 0.9, 1.05, and 0.8, respectively, to Du Pont 508, Du Pont 555, Eastman type II and Ilford PM-1 films, respectively.

The foregoing has described a radiation dosimeter film badge, having a substantially flat response to X-ray energies from about 40 to 1250 kev. radiations. A preferred embodiment illustrating the principles has been described. However, it is understood that many changes are possible within the scope of the invention, and it is desired that the invention be considered limited only by the appended claims.

What is claimed is:

1. A nuclear radiation dosimeter film badge for recording exposure to X or gamma rays over an energy range of from about 40 to 1250 kev. with a response limited to not exceed the ratio of 0.7 to 1.8 on a logarithmic scale, comprising a flat elongated plastic housing and a film supported substantially in the median plane parallel to the plane of flatness of said housing, said film having disproportionate sensitivity to low energy radiation of the order of 40 kev. compared to the sensitivity to high energy radiation of the order of 100 kev. and above, a composite metal plate filter and a single metal plate filter supported in said housing adjacent to and parallel to said film, said composite metal plate containing a plurality of metals of dissimilar radiation absorptive characteristics relative to energy, and said single filter consisting of a metal having a peak absorptive characteristic at about 50 kev., the range of disproportionate film sensitive energies being divided into as many substantially equal increments as the number less one of dissimilar metals used in said composite filter, and one each of said metals being selected to have a K-edge at one of the limits of each energy increment and each of said metals having a thickness $x_1$, $x_2$, $x_n$, etc., as determined by the simultaneous solution of equations of the form $$u_{H_1}x_1 + u_2x_2 + \ldots + u_nx_n = \ln F_{0_1} - \ln F_k$$
$$u_1x_1 + u_{H_2} + \ldots + u_nx_n = \ln F_{0_2} - \ln F_k$$
$$\ldots \ldots \ldots \ldots \ldots$$
$$u_1x_1 + u_2x_2 + \ldots + u_{H_n}x_n = \ln F_{0_n} - \ln F_k$$

where $u_{H_1}$ is the higher K-edge value of the true absorption coefficient of element 1 at the K-edge energy of element 1, $u_2$ is the true absorption coefficient of element 2 at the K-edge energy of element 1, $u_1$ is the true absorption coefficient of element 1 at the K-edge energy of element 2 and element $u_{H_2}$ is the higher K-edge value of the true absorption coefficient of element 2 at the K-edge energy of element 2, and $F_{0_1}, F_{0_2}, F_{0_n}$ are the unfiltered film responses under the single plate filter at the K-edge energy of elements 1, 2 ... $n$ respectively, and the smaller response value at each K-edge is limited by the preselected defined limit $F_k$ and the sensitivity $F_f(E)$ of the film under the filters at any energy E over the selected range being calculated by the equation $$F_f(E) = F_0(E)e^{-u_1(E)x_1 + u_2(E)x_2 \ldots u_n(E)x_n}$$

a lead shield supported in the housing, closely fitting and surrounding the edges of the composite plate filter and the single element plate filter.

2. The dosimeter film badge of claim 1 in which the single element plate filter is a 0.020 copper sheet, and the composite filter comprises a plate of mixed powders of compacted gadolinium, 0.148 gm./cm.$^2$; erbium, 0.148 gm./cm.$^2$; tantalum, 0.114 gm./cm.$^2$; gold, 0.117 gm./cm.$^2$; and bismuth 0.074 gm./cm.$^2$, whereby the response of the film lying under the filters over the range of from 40 to 1250 kev. is within plus or minus 30% of the response obtained at 650 kev.

3. The film badge of claim 2 for additionally recording thermal neutron exposures in which said plastic housing contains a second pair of opposed recesses, a composite filter plate comprising essentially erbium, 0.148 gm./cm.$^2$; tantalum, 0.114 gm./cm.$^2$; gold 0.117 gm./cm.$^2$; and bismuth, 0.074 gm./cm.$^2$ supported in said recesses, a molybdenum plate having a thickness of 0.010 inch and a copper plate of 0.020 thickness also supported in said second pair of recesses.

4. The film badge of claim 3 in which the copper plate is supported adjacent the film, the molybdenum plate is supported against the copper plate and the non-gadolinium plate is supported against the copper plate, whereby the non-equivalence of the gadolinium containing filter and the combination non-gadolinium filter with molybdenum plate with respect to thermal neutrons results in comparative areas on the film which are a measure of thermal neutron exposure.

5. The film badge of claim 4 in which said plastic housing contains a pair of opposed open windows and a lead frame in said windows whereby said film is directly exposed to incident beta rays and soft X-rays and whereby said film badge is adapted to record a radiation incident of any of thermal neutrons, gamma rays, beta rays or X-rays and enable the subsequent ascertainment of the nature and amplitude of any of such radiation exposures.

References Cited in the file of this patent

UNITED STATES PATENTS

| | | |
|---|---|---|
| 2,483,991 | Wollan | Oct. 4, 1949 |
| 2,624,846 | Touchilin | Jan. 6, 1953 |
| 2,659,013 | Davis | Nov. 10, 1953 |